July 9, 1935.   F. PEUKER   2,007,306
WEIGHING SCALE
Filed Aug. 19, 1931
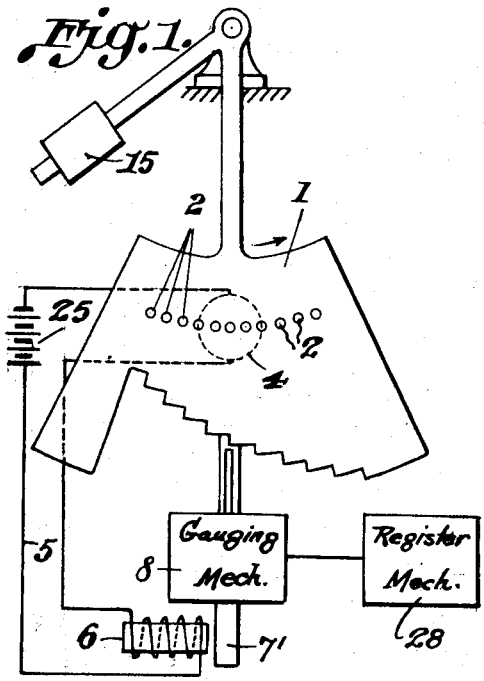
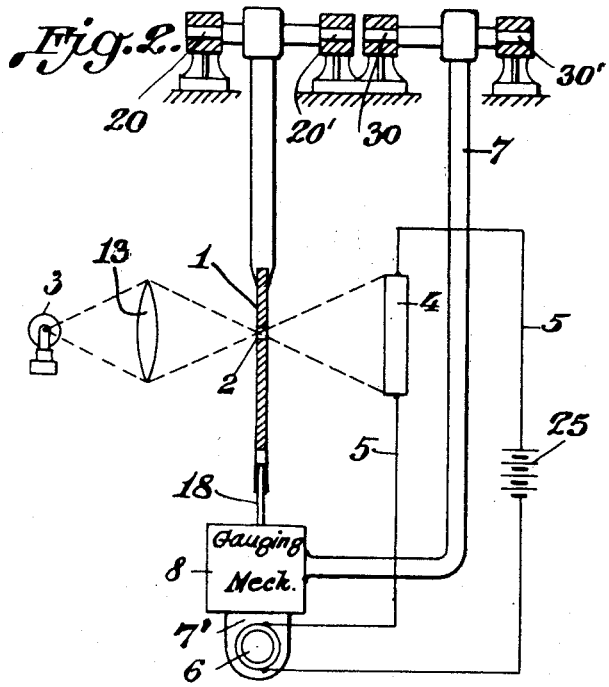
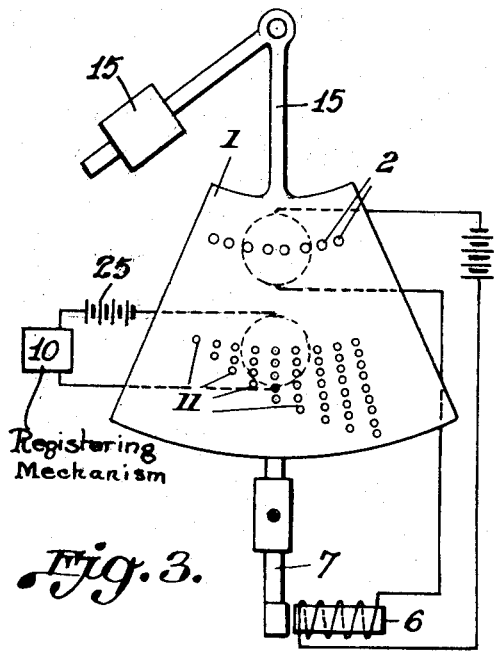
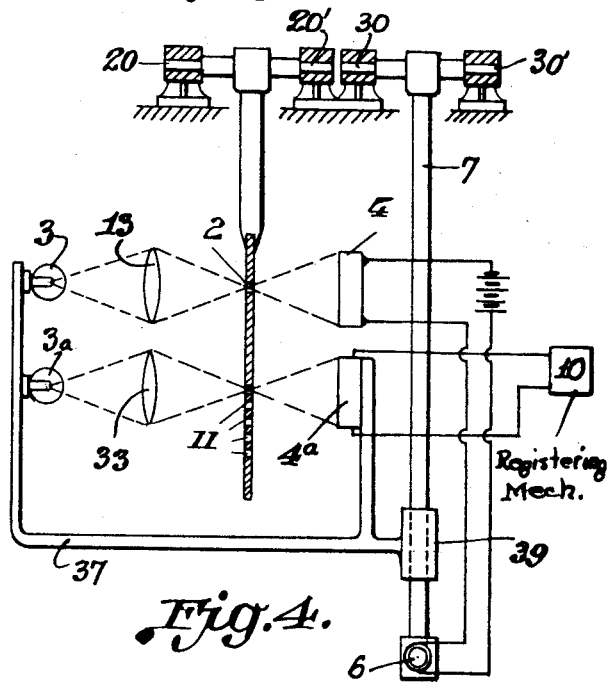
Inventor:
F. Peuker
by Forte & Codier
Attorneys Patented July 9, 1935

2,007,306

UNITED STATES PATENT OFFICE 2,007,306

WEIGHING SCALE

Franz Peuker, Darmstadt, Germany

Application August 19, 1931, Serial No. 558,183
In Germany August 19, 1930

19 Claims. (Cl. 265—5)

This invention relates to improvements in measuring instruments and more particularly to weighing scales of the pendulum type. Such a type of scale is shown in the United States patent to Hem, No. 1,318,559, October 14, 1919. Devices are known in the prior art for indicating or recording the weights applied to such a type of scale. The United States patent to Willners, No. 1,192,967, August 1, 1916, shows a mechanically actuated apparatus for registering the loads applied upon the machine. The United States patent to Torgersen, No. 1,573,950, February 23, 1926, shows an electrically actuated mechanism for indicating weights.

The object of the invention is to provide an arrangement for eliminating incorrect registrations upon the type of scale disclosed in the above mentioned Patent No. 1,192,967 in which each registration is composed of a numeral in each decimal place of the measuring range. Thus three segments or disks are fixed to the weighing dial. One of these disks serves to control a lever which sets the units indication, another disk controls the setting of the tens indication and another the hundreds indication. These disks may be increased for greater ranges of weight indications. In such an arrangement, the amounts remaining in each decimal setting must be accurately determined and aligned in the decimal setting of the successively lower order, and subsequently these settings are transferred to an indicating or recording device. The independence of the settings in the several orders of the registrations gives rise to a possibility for errors creeping into the registrations under some circumstances. If, for instance, the applied weight lies between 499 and 500, it is possible that the setting in the hundreds decimal division at the transition point from one unit to the other is slightly faulty, in which case the recording mechanism sets up an indication of 599 instead of 499.

The present invention contemplates the elimination of any such irregularities. This result is attained by a correcting device which comes into action every time a transition between two units in one of the decimal orders is at hand. At this time, the controlling device is displaced in one definite direction so that such measurements are displaced in one direction only, that is, to the next higher number, thereby avoiding any such ambiguous and erroneous results as described above.

The invention may best be understood by reference to the accompanying drawing wherein Fig. 1 is a portion of the weighing apparatus schematically illustrating the feature of the invention as applied to a scale having a mechanical control of the registering mechanism, Fig. 2 is a side elevation of Fig. 1, Fig. 3 is a portion of a weighing apparatus similar to that shown in Fig. 1 schematically illustrating the feature of the invention as applied to a scale having an electrical control of the registering mechanism, and Fig. 4 is a side elevation of Fig. 3.

In the specific embodiment shown in Fig. 1, a segment 1 is connected by suitable transmission members to the weighing pendulum system 15 whereby the segment is displaced in the direction indicated by the arrow from its rest position an amount proportional to the weight applied to the scale. The segment 1 corresponds to one of the dials 10 in the above-mentioned patent to Willners No. 1,192,967. Its zero setting corresponds to the position of the segment when its right hand portion is opposite the feeler 18. With increasing weights, the segment swings in a counterclockwise direction, denoted by the arrow in Fig. 1. Only one segment has been shown for the sake of simplicity, and it may be assumed that this segment is appurtenant to the tens order of the indicating mechanism, corresponding to disk 18 in the above-mentioned Patent No. 1,192,967. The segment has at least as many calibration steps as there are numerals in the order, each of which steps affects an indicating and printing mechanism. The single segment illustrated is capable of controlling only one order of numerals. By providing other segments having graduations bearing a decimal relationship to those shown in Fig. 1, the range of the indicating mechanism may be increased to as many places as may be desired. Upon the application of a weight to the scale and the positioning of the counterbalancing pendulum system 15 correspondingly, a record of the weight is obtained by affecting a registering device 28 in accordance with the position of segment 1, which in turn is controlled by the pendulum system. The registering device in the instant disclosure corresponds to the recording device 39 in the above-mentioned Willners patent. A gauging mechanism 8 having a feeler 18 is mounted for reciprocable movement upon a carrier 7', the latter of which is capable of rocking a slight amount by being connected to a support 7 which is pivoted upon an axis 30—30' (Fig. 2), coaxial with axis 20—20'. The feeler 18 is designed for actuation towards and from the stepped edge of the segment 1 by any suitable means, corresponding to the mechanical feeler system shown in the above-mentioned patent 1,192,967, including feeler 23, pivoted arm 22 and vertical rack bar 50, shown in Fig. 1 of that patent. This portion of the mechanism is not shown for the sake of clarity, and neither is the mechanism for transmitting the motion of feeler 18 to the registering device 28. Any devices known in the prior art may be used, and they may be controlled by a lever resembling handle 28 in Fig. 1 of the patent to Willners. The transmission mechanism from the feeler device or gauging means to the registering device is indicated only schematically in Fig. 1. The gauging system cooperating with the segment shown in Fig. 1 assures accurate results in most instances. However, at the transition points between one step and the adjacent ones, a slight mis-alignment of the feeler system with respect to the segment may cause the feeler to be erroneously advanced an additional step, which in the higher orders is of great consequence as explained above for a reading of 499. In Fig. 1, the feeler 18 is shown at one of such transition points.

According to the invention, a series of apertures, 2, is arranged in the segment 1, each aperture being in alignment with a step in the segment and the axis of movement thereof. In alignment with feeler 18, at the level of apertures 2 and upon one side of the segment 1, is disposed a light source 3 with a lens system 13 for directing a point of light upon the row of apertures 2. The line of apertures 2 is the locus of the point of light concentrated upon the segment 1 in the course of movement of the latter under the control of the pendulum system. Upon the opposite side of segment 1 is disposed a light sensitive cell 4 in a circuit 5 containing a battery 25 and an electromagnet 6. When magnet 6 is energized, it is designed to attract the carrier 7' which is capable of swinging a slight amount by means of arm 7 oscillating on axis 30—30'. Magnet 6 is energized only at those times when segment 1 comes to rest with one of the calibration steps adjacent the feeler 18, at which time an aperture 2 allows the transmission of a ray of light to cell 4, thereby decreasing the resistance thereof and the circuit 5 to cause a sufficient current to flow therethrough to energize the magnet. The movement of carrier 7' carries the feeler 18 from out of alignment with the step at which the segment is set, and the subsequent travel of feeler 18 definitely strikes the portion of the segment upon the left of the step. The possibility of the feeler sometimes striking upon the right of the step and at other times, the left of the step is thereby excluded. With the direction of movement of the feeler being known, and the same arrangement being provided for the several orders, a definite indication of the weights applied is made possible, as explained above.

The use of the invention is not confined to mechanically actuated registering devices for weighing scales. The same may also be embodied in electrically controlled registering devices. Such an arrangement is indicated in Figs. 3 and 4 wherein like elements are designated by the same reference characters as in Figs. 1 and 2. Instead of a stepped segment designed to cooperate with a mechanical feeler, a series of apertures 11 are provided which cooperates with an assembly connected to a support 37. This assembly consists of a light source 3a which cooperates with a lens 33 to direct a pencil of light to a light-sensitive cell 4a on the opposite side of segment 1. The body 37 carrying this assembly of elements is reciprocable on carrier 7 at 39 to effect the scanning operation and to register in device 10 the number of impulses in accordance with the number of apertures 11 traversed. The carrier 7 is rocked by relay 6 at critical points of transition on which are aligned apertures 2 in a manner identical with the showing in Figs. 1 and 2.

It is understood that the term "registering device" used in the specification and claims connotes either a visual indicator or a recorder embodying a printing mechanism.

The term "jumping", as used in the claims, connotes a movement for altering the field of gauging operations between the gauging member and the gauged member, and includes a relative shifting between the two members as clearly disclosed above.

Having described my invention, what I claim is:

1. In a weighing machine having a counterbalancing pendulum adapted to be positioned in accordance with the weights applied to the machine, a segment having calibrations thereon for each order of numerals indicating the applied weights controlled by said pendulum, a feeler mechanism for gauging the setting of a segment appurtenant to a higher order, a device for registering the weight applied to the machine, means for transmitting the gauging movement of said feeler mechanism to a corresponding element of said registering device, and means for laterally displacing said gauging means at the setting of said segment upon a transition point in the calibration units of said higher order, whereby erroneous records are excluded.

2. In a weighing machine having a counterbalancing pendulum adapted to be positioned in accordance with the weights applied to the machine, a segment having calibrations thereon for the numerical values of the weights applied to the machine controlled by said pendulum, means for gauging the setting of said segment, a device for registering the weight applied to the machine, means for transmitting the gauging movement of said gauging means to said registering device, and means for laterally displacing said gauging means responsive to the setting of said segment upon a transition point in the calibration scale of said segment, whereby erroneous records are excluded.

3. In a weighing machine having a counterbalancing pendulum adapted to be positioned in accordance with the weights applied to the machine, a segment having calibrations thereon for the numerical values of the weights applied to the machine controlled by said pendulum, means for gauging the setting of said segment, a device for registering the weight applied to the machine, means for transmitting the gauging movement of said gauging means to said registering device, and means for laterally displacing said gauging means responsive to the setting of said segment upon a transition point in the calibration scale of said segment, whereby erroneous records are excluded, said last mentioned means comprising an armature connected to said gauging means, an electromagnet adjacent said armature, an electric circuit for said electromagnet comprising a source of electrical energy and a light-sensitive cell disposed upon one side of said segment, a light source upon the other side of said segment, a plurality of apertures in said segment in the locus of the light ray extending between said light source and cell as said segment is moved by said pendulum, one of said apertures corresponding to each of the transition points in the calibration scale of said segment, whereby the light ray passed thereby affects the light-sensitive cell and the electrical circuit to energize said electromagnet.

4. In a weighing machine, a setting member controlled by the weight applied to the machine having calibrations thereon corresponding to the numerical values of the applied weights, means for gauging the setting of said member, a device for registering the weight applied to the machine, means for transmitting the gauging movement of said gauging means to said registering device, and means for laterally displacing said gauging means responsive to the setting of said member upon a transition point in the calibration scale of said member, whereby erroneous records are excluded.

5. In a weighing machine, a setting member adapted to be positioned in accordance with the weight applied to the machine, a series of elements on said member corresponding to the increments of the weights adapted to be measured by the machine, said elements having critical transition points, a registering mechanism, sensing means for gauging said elements and correspondingly controlling said registering mechanism, and means for laterally shifting said sensing means at critical transition points between said elements, whereby erroneous registrations are excluded.

6. In a weighing machine, setting means adapted to be controlled in accordance with the loads applied to the machine, a series of elements on said setting means corresponding to the increments of the weights adapted to be measured by the machine, a registering device, sensing means for gauging said setting means and correspondingly controlling said registering device, and means for jumping said sensing means at critical transition points between said elements whereby erroneous registrations are excluded.

7. In a weighing machine, a setting member adapted to be positioned in accordance with the weight applied to the machine, a series of elements on said member corresponding to the increments of the weights adapted to be measured by the machine, said elements having critical transition points, a registering device, sensing means for gauging said elements and correspondingly controlling said registering device, and means for jumping said sensing means at critical transition points between said elements whereby erroneous registrations are excluded.

8. In a device for registering numerical values, two relatively movable members, a series of elements on one of said members corresponding to the increments of the numerical values, a registering device, the other one of said members constituting a sensing means for gauging the elements on said first member and correspondingly controlling said registering device, and means for jumping said sensing means at critical transition points between said elements whereby erroneous registrations are excluded.

9. In a weighing machine, a setting member controlled by the weight applied to the machine having calibrations thereon corresponding to the numerical values of the applied weights, means for gauging the setting of said member, a device for registering the weight applied to the machine, means for transmitting the gauging movement of said gauging means to said registering device, and light-controlled means for laterally displacing said gauging means responsive to the setting of said member upon a transition point in the calibration scale of said member, whereby erroneous records are excluded.

10. In a weighing machine, a setting member adapted to be positioned in accordance with the weight applied to the machine, a series of elements on said member corresponding to the increments of the weights adapted to be measured by the machine, said elements having critical transition points, a registering mechanism, sensing means for gauging said elements and correspondingly controlling said registering mechanism, and light-controlled means for laterally shifting said sensing means at critical transition points between said elements, whereby erroneous registrations are excluded.

11. In a weighing machine, setting means adapted to be controlled in accordance with the loads applied to the machine, a series of elements on said setting means corresponding to the increments of the weights adapted to be measured by the machine, a registering device, sensing means for gauging said setting means and correspondingly controlling said registering device, and light-controlled means for relatively shifting said sensing means and setting means at critical transition points between said elements whereby erroneous registrations are excluded.

12. In a weighing machine, a setting member adapted to be positioned in accordance with the weight applied to the machine, a series of elements on said member corresponding to the increments of the weights adapted to be measured by the machine, said elements having critical transition points, a registering device, sensing means for gauging said elements and correspondingly controlling said registering device, and means comprising an electromagnet in circuit with a light-sensitive device for relatively shifting said sensing means and setting member at critical transition points between said elements whereby erroneous registrations are excluded.

13. In a weighing machine, a setting member adapted to be positioned in accordance with the weight applied to the machine, a series of elements on said member corresponding to the increments of the weights adapted to be measured by the machine, said elements having critical transition points, light-permeable apertures in alignment with the critical transition points, a registering device, means for gauging the setting of said member, means for transmitting the gauging movement of said gauging means to said registering device, a light source and a light-sensitive cell on opposite sides of said member, said cell adapted to be controlled by said light source upon the alignment of said light source, one of said apertures and cell, and an electromagnet controlled by said cell for shifting said gauging means relatively to said setting member to exclude erroneous registrations.

14. In a device for registering numerical values, two relatively movable members, a series of elements on one of said members corresponding to the increments of the numerical values, said elements having critical transition points, a registering device, the other one of said members constituting a sensing means for gauging the elements on said first member and correspondingly controlling said registering device, and light-controlled means for jumping said sensing means at the critical transition points between said elements, whereby erroneous registrations are excluded.

15. In a device for registering numerical values, two relatively movable members, a series of elements on one of said members corresponding to the increments of the numerical values, said elements having critical transition points, a registering device, the other one of said members constituting a sensing means for gauging the elements on said first member and correspondingly controlling said registering device, and light-controlled means for relatively shifting said sensing means and first member at critical transition points between said elements, whereby erroneous registrations are excluded.

16. In a device for registering numerical values, two relatively movable members, a series of elements on one of said members corresponding to the increments of the numerical values, said elements having critical transition points, a registering device, the other one of said members constituting a sensing means for gauging the elements on said first member and correspondingly controlling said registering device, and light-controlled means for relatively shifting said sensing means and first member at critical transition points between said elements comprising an electromagnet and light-sensitive cell in circuit therewith controllable at said critical transition points.

17. In a device for registering numerical values, two relatively movable members, a series of elements on one of said members corresponding to the increments of the numerical values, said elements having critical transition points, a registering device, the other one of said members constituting a sensing means for gauging the elements on said first member and correspondingly controlling said registering device, light-permeable apertures in alignment with the critical transition points, a light source and a light-sensitive cell on opposite sides of said first member, said cell adapted to be controlled by said light source upon the alignment of said light source, one of said apertures and cell, and an electromagnet controlled by said cell for relatively shifting said first member, and sensing means at critical transition points to exclude erroneous registrations.

18. In a device for registering numerical values, two relatively movable members, a series of elements on one of said members corresponding to the increments of the numerical values, a registering device, the other one of said members constituting a sensing means for gauging the elements on said first member and correspondingly controlling said registering device, and means for laterally displacing said sensing means at critical transition points between said elements whereby erroneous registrations are excluded.

19. In a device for registering numerical values, two relatively movable members, a series of elements on one of said members corresponding to the increments of the numerical values, a registering device, the other one of said members constituting a sensing means for gauging the elements on said first member and correspondingly controlling said registering device, and means for shifting said sensing means relative to first member at critical transition points between said elements whereby erroneous registrations are excluded.

FRANZ PEUKER.